United States Patent
Qassoudi

(10) Patent No.: US 7,574,628 B2
(45) Date of Patent: Aug. 11, 2009

(54) CLICKLESS TOOL

(76) Inventor: Hadi Qassoudi, 410 Sierra Vista, Mountain View, CA (US) 94043

(*) Notice: Subject to any disclaimer, the term of this patent is extended or adjusted under 35 U.S.C. 154(b) by 659 days.

(21) Appl. No.: 11/402,662

(22) Filed: Apr. 11, 2006

(65) Prior Publication Data

US 2007/0106939 A1    May 10, 2007

Related U.S. Application Data

(60) Provisional application No. 60/736,143, filed on Nov. 14, 2005.

(51) Int. Cl.
*G06F 11/00* (2006.01)

(52) U.S. Cl. .................................. 714/39; 345/163

(58) Field of Classification Search .................. 714/39; 345/163, 168; 713/2; 715/704
See application file for complete search history.

(56) References Cited

U.S. PATENT DOCUMENTS

| 6,211,861 B1* | 4/2001 | Rosenberg et al. | 345/163 |
| 7,136,045 B2* | 11/2006 | Rosenberg et al. | 345/163 |
| 2006/0132447 A1* | 6/2006 | Conrad | 345/168 |
| 2008/0177994 A1* | 7/2008 | Mayer | 713/2 |

* cited by examiner

*Primary Examiner*—David Ton
(74) *Attorney, Agent, or Firm*—West and Associates, A PC; Stuart J. West; Charlotte Rodeen-Dickert

(57) ABSTRACT

A novel click-less tool system for performing user input device actions on computer systems, such as mouse clicks, automatically and without the need to mechanically perform these actions. All input is carried out by moving the cursor only. The system provides a user with visual trigger windows arranged near the position of the cursor on the screen and which becomes visible for a short period of time whenever the user mouse/input cursor stops. When the user moves the cursor and hovers over one of the visible activator windows, the click-less tool program automatically performs a preprogrammed action, then places the cursor back to where the user stopped before the trigger windows were visible. Once the action is performed the trigger windows disappear.

20 Claims, 4 Drawing Sheets

CLICKLESS TOOL

CLAIM OF PRIORITY

This application claims the benefit of U.S. Provisional Application No. 60/736,143, filed Nov. 14, 2005.

FIELD OF THE INVENTION

The invention relates to ergonomic systems for a user's interactions with a computer, such as inputting commands through the use of a mouse or trackball. The invention eliminates the need for mouse clicks which may alleviate pain and prevent injuries associated with repetitive stress injury.

BACKGROUND

We are becoming increasingly dependent on the computer for our everyday activities, whether at work or for leisure. The personal computer (PC), along with the Internet, has revolutionized the way we work, obtain information, and play. However, a great number of people may have problems working with a modern computer because it requires that they be proficient with a computer mouse or other pointing device such as a touchpad or trackball. (In this document, we will refer to all such computer pointing devices that a user uses to move a cursor on the computer screen generically as "mice" or "computer mice".)

Almost all current computer operating systems (OS) on PCs and computer workstations, whether it is Microsoft Corporation's Windows,® Apple Computer Inc.'s Mac OS, flavors of Unix or Linux, use a windowing interface that utilizes clickable icons and menus on the computer screen. To input commands to the computer, a user commonly uses a mouse to move a cursor on the screen, and to click on the mouse's button(s) to click on icons, buttons, webpage links, drag-down menus and the like. (A mouse click is the action of pressing (i.e. 'clicking') a button on a mouse in order to trigger an action on the computer). The trend of using mouse-clicks for input appear likely to continue into the future, as it has become ingrained into the way we interact with our computers.

Clicking on a mouse button require a certain nimbleness in the user's fingers, especially for operations such as double-clicks (in which the user clicks on the mouse button twice in rapid succession), drag-and-drops (in which the user clicks and holds the mouse button, moves the cursor and then releases the mouse button), copy-and-paste (in which the cursor is moved to the beginning of the text, the mouse button held down, and the cursor dragged across the text to be marked) and even triple-clicks (in which the user presses the button three times in quick succession, most commonly seen in word processors and web browsers to select a whole section of text). However, a user suffering from arthritis or other ailments of the finger joints may lack the capacity to perform these required actions to operate the computer properly.

Finger and thumb arthritis are a common affliction that affect many people and their ability to use a computer mouse properly. There are two types of arthritis that commonly affect the fingers and thumb. These are osteoarthritis and rheumatoid arthritis. Osteoarthritis, also called degenerative joint disease and wear-and-tear arthritis, is the most common type of arthritis. In this condition, the normal cartilage is steadily worn away, exposing bare bone at the joints. Rheumatoid arthritis causes a different type of joint destruction, commonly affecting knuckles at the base of the fingers. Patients suffering from hand arthritis often find it difficult, painful, or even impossible to perform the clicking action on the mouse button with their finger. Apart from arthritis, there are other afflictions that may affect a user's use of his or her fingers, including complications from a stroke, Repetitive Strain Injuries (RSI) such as carpel tunnel syndrome, and tendonitis.

The fact is, even a user with healthy hands may develop complications associated with RSI with prolonged repetitions of mouse clicking. Studies have shown that a user may click the mouse button upwards of two million times a year. What is desired is a system that can eliminate the need for clicking on mouse buttons that any user, whether those with healthy hands or those having problems with them, will find beneficial.

A number of prior art devices have been developed to aid remove the need for mouse clicks. Foot pedals, including ones available from Fentek Industries, Arizona, seek to replace clicking of the mouse button with a foot-operated pedal or button. While these devices may alleviate the problems with hand and finger related afflictions, they merely replace one set of mechanical actions with another. The repetitive use of foot presses may also lead to repetitive stress injuries of the foot and ankle. Further, for most people, the foot is far less nimble than the hand, leading to delays in operation of the computer.

Other products have attempted to eliminate the need for mouse clicks via mouse software. Quill Nib (formerly Mouse Tools) from Design Appliances, Inc. is one such program that simulates clicks of the mouse whenever the cursor stops moving. However, this requires the user to move the cursor away from the button once the software automatically clicks on a button, or the software will click on the button more than once and leading to unintended results. Further, it doesn't differentiate between left and right mouse button clicks or simulate the more complicated operations such as triple-clicks and drag and drops.

What is desired, therefore, is a system that is easily adaptable for use with a windowing OS that eliminates the need for the user to click the mouse button for interacting with the computer.

What is also desired is a system that is simple to operate and does not require significant training for a user to be adept at using. The system should be intuitive to any user that is already accustomed to operating a computer with mouse-clicks.

The system should be configurable for different users' preferences and different levels of expertise.

The system should be as useable with any computer cursor pointing device, whether a mouse, touchpad, pointing stick, or trackball.

SUMMARY OF THE INVENTION

The present disclosure is for a novel click-less tool system for performing user input device actions, such as mouse clicks, automatically and without the need to mechanically perform these actions. All input is carried out by moving the cursor only. The system provides a user with visual trigger windows arranged near the position of the cursor on the screen and which becomes visible for a short period of time whenever the user mouse/input cursor stops. When the user moves the cursor and hovers over one of the visible activator windows, the click-less tool program automatically places the cursor back to where the user stopped before the activator windows were visible and performs a preprogrammed action (s) such as left click, right click, or any individual or a combination of input actions. Once the action is performed the trigger windows disappear.

DETAILED DESCRIPTION

In one embodiment of the invention, the "Clickless Tool" is a small software application that runs transparently with the OS and a mouse driver program that controls the movement of the cursor. It is possible to program the click-less tool in a variety of programming languages, including, C++, Microsoft's .Net framework, Java, Visual Basic, or any other programming language known or convenient. In other embodiments of the system, the Clickless Tool feature set can be incorporated into the mouse driver program, or into the OS feature set.

The Clickless Tool works by monitoring the movement of the cursor. Whenever a user moves the cursor with a pointing device and then stops, the Clickless Tool application records the cursor position and after a short pre-defined time period (e.g. 220 milliseconds), one or more "Trigger Windows" become visible on the screen at a position near the cursor.

Figure 1:
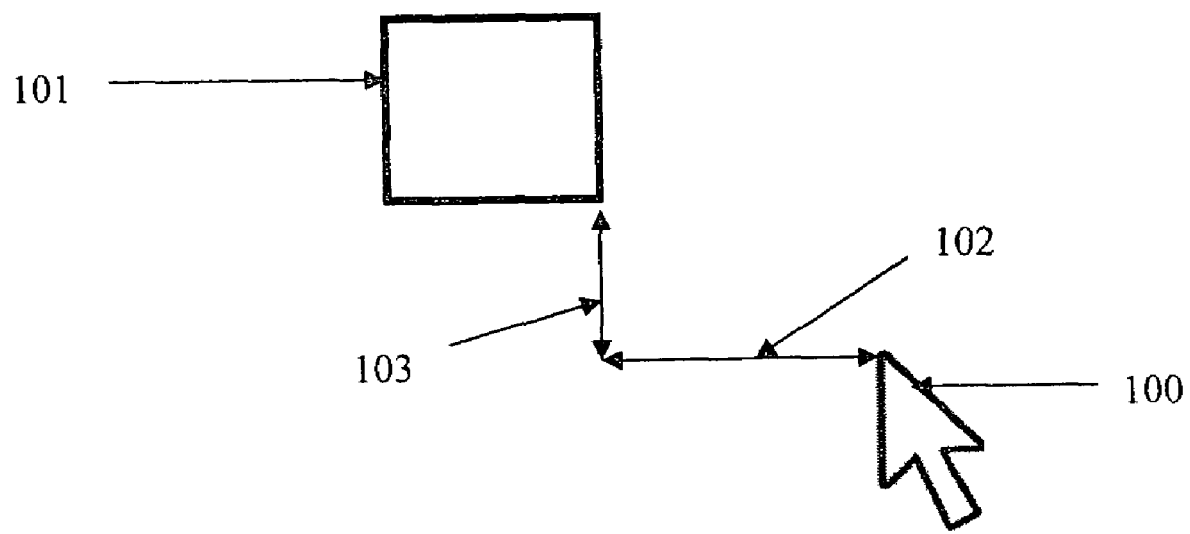
FIG. 1 depicts an on-screen cursor and an accompanying Trigger Window.

An on-screen cursor 100 and an accompanying Trigger Window 101 are depicted in FIG. 1. The Trigger Window 101 is a screen element that can be drawn directly on a computer display screen using the operating system native drawing capability or as a form as in Windows Form. The shape is chosen for easy visual identification. In the following discussion, the Trigger Window 101 is chosen to be a rectangle, but any arbitrary shape can be chosen. Any number of Trigger Windows can be used at the same time, each Trigger Window designating a specific action such as Left-Click, Right-Click, Left Double-Click, Right Double-Click, etc. The number of Trigger Windows that is used can be user-configurable.

To send a command to the OS to perform an action that is associated with mechanical mouse click(s), the user moves the cursor over one of the Trigger Windows and hovers or stops for a short, predefined time span. There is no need to mechanically click on mouse buttons. At the end of the short predefined time period (e.g. 200 milliseconds), the Clickless Tool application moves the cursor back to the originally recorded cursor position prior to the appearance of the Trigger Window(s) and simulates a command action that was associated with that Trigger Window, such as a left click, and sends a message to the operating system to perform the action. After the action is performed the Trigger Windows disappear. If the user does not move the mouse/input cursor again after a predefined time span (e.g. 700 milliseconds) and while the Trigger Windows are visible, the Trigger Windows will disappear. The whole process is repeated as long as the Clickless Tool application is running.

The Clickless Tool is also able to handle what's commonly called "mouse gestures". Mouse gestures are a fast way to execute frequently used commands without using the keyboard, menus or toolbars. Instead, the user holds down a mouse button (usually the right one), moves the mouse in a certain way to form a path on the screen, or so-called "gesture", then releases the mouse button. (In web browsers like Firefox or Opera, mouse gestures are used to go back or forward a page, switch between tabs, open multiple links at once, control text or image size, and numerous other functions). The Clickless Tool can record the cursor's path by recording every Trigger Window that the mouse/input cursor entered and exited and the ones the cursor stopped and hovered over, as well as the path taken by the cursor. The path that the cursor makes is recorded and constantly translated to a unique key; the key is then checked for an associated command action that could be simulated and sent to the operating system. For example, a user can have the Clickless Tool simulate a mouse right click whenever the cursor enters and leaves Trigger Window X and then enters and hovers over Trigger Window Y, where the relative placement of the Windows X and Y form the path the cursor travels to perform the gesture.

To enable any user to work comfortably with the Clickless tool system, the Trigger Window should be customizable to a user's preferences. It is an important feature of the Clickless Tool that any user can use the Tool and have it conform to his or her personal preference. Hence, in a preferred embodiment, almost all parameters affecting the behavior of the Clickless Tool can be custom set by the user.

By way of example, the look and feel and behavior of the Trigger Window can be customized by changing any one or more of the following attributes: a) Size: The width and height in pixels of each Trigger Window; b) Global Size Increase: Increase or decrease the size of all available Trigger Windows by the same percentage; c) Opacity: Set the opacity percentage of all Trigger windows; d) Height/Width Proportion: Set the height of each Trigger Window as a percentage of the width; e) Horizontal Offset: Set the horizontal distance between the cursor (cursor hot spot) and the closest corner of the main Trigger Window. A user can have one or more Trigger Windows that become visible every time the mouse/input cursor stops. The location of these Trigger Windows can be set so that they are always the same distance away from the cursor (See FIG. 1: the Horizontal offset is designated by distance marker 102); f) Vertical Offset: Set the vertical distance between the cursor (cursor hot spot) and the closest corner of the main Trigger Window. A user can have one or more Trigger Windows that become visible every time the mouse/input cursor stops. The location of these Trigger Windows can be set so that they are always the same distance away from the cursor (See FIG. 1: the Vertical Offset is designated by distance marker 103); g) Trigger Window Borders: Each Trigger Window has four line borders (top, bottom, left, and right). Any or all of these borders can be made visible or hidden and each border can have a separate color. These borders can be useful when the user wants the Trigger Window invisible except for one or more borders visible. Borders are useful if the user wants to see only the frame of the Trigger Window; h) Color type and Color: A Trigger Window can have a single solid color or a double gradient color and the user can choose any color; i) Image: A user can use any image as a background for a Trigger Window; j) Visibility Type: A user has a choice of three types of visibility: 1) Visible: The Trigger Window will always be visible whenever the mouse/input cursor stops, 2) Hidden: The Trigger Window is not visible to the user and 3) Restricted: A restricted Trigger Window is visible only when a user moves mouse/input cursor through a specific area of a visible Trigger Window.

Next, we will discuss how a user would accomplish some exemplary tasks with the Clickless Tool. Note that in the following discussion, the positions or the relative positions of the Trigger Windows are for illustrative purposes only and are not meant to be limiting.

Figure 2:
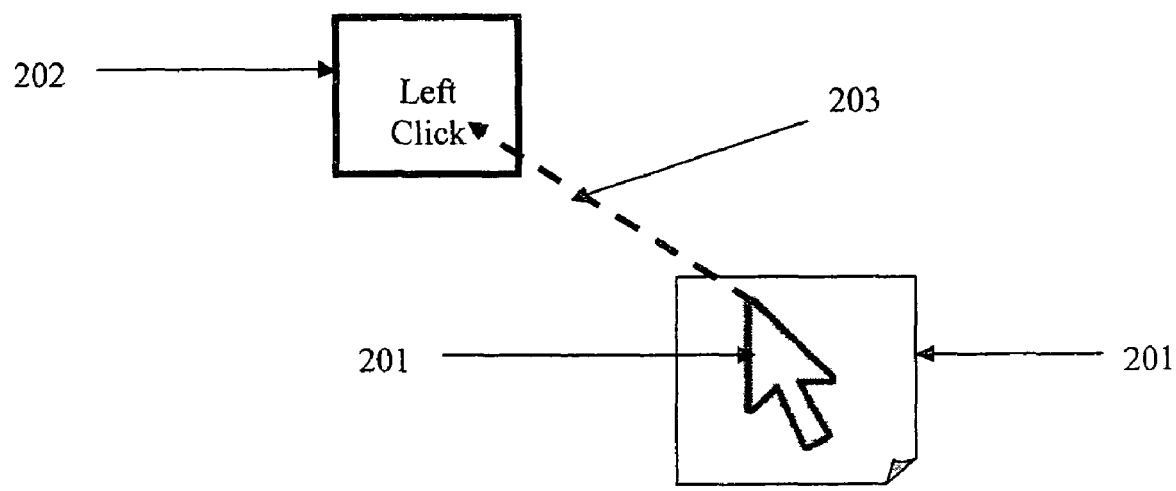
FIGS. 2, 3, 3a, 4 and 5 depicts examples of a user using the application to perform common input tasks.

The user uses the mouse or other pointing device to move the cursor on the screen normally. Refer to FIG. 2. To perform a left-click, the user pauses the cursor 200 over an icon, weblink or other screen element 201 that he wants to click on. When the cursor is paused (i.e., stops moving), the Main Trigger Window 202 will appear just above and to the left of the cursor 200. The user then moves the cursor over the Main Trigger Window 202. The user moves the cursor to travel a short diagonal distance 203 at approximately 45 degrees angle up and to the left. Once the cursor enters the Main Trigger Window 202, the user hovers there for a short moment to indicate he wants to perform the action designated by the Main Trigger Window 202. The Application then automatically moves (returns) the cursor back to where it was before the Trigger Window appeared (i.e., the screen element 201) and signals the OS to perform a left-click at the cursor position (remember that the cursor 200 has been returned to the location of the screen element 201).

Figure 3:
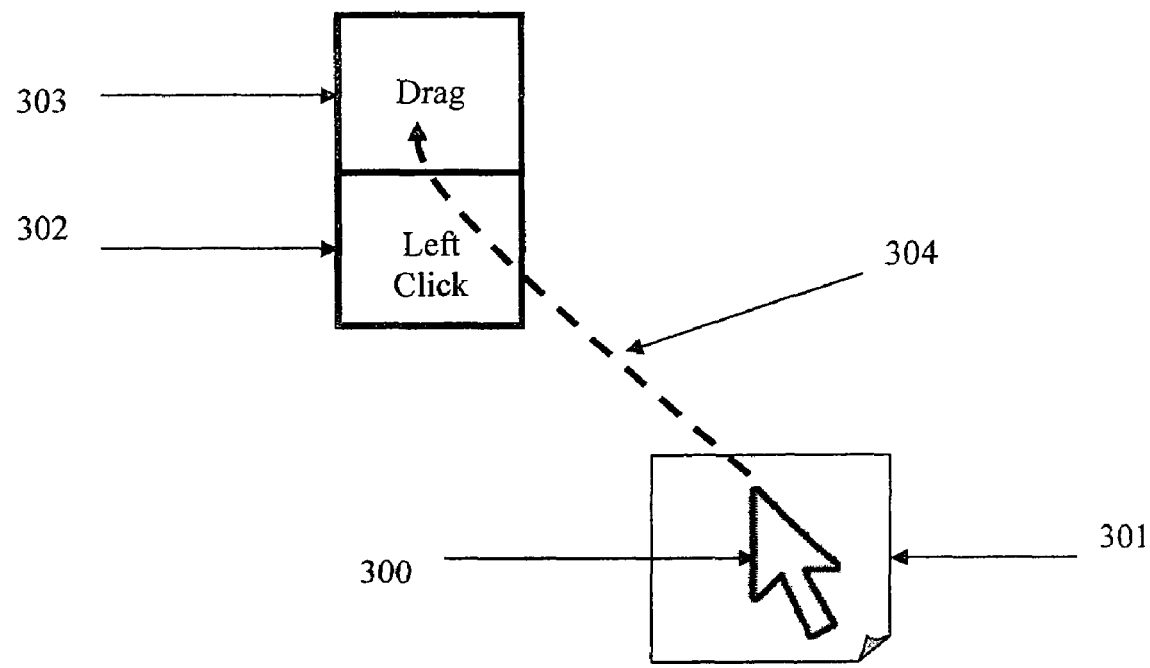

Refer now to FIG. 3. To perform a "drag and drop", the user pauses the cursor 300 at position 301 where he wants to begin the drag operation (this could be an icon, or the beginning of a block of text the user wants to mark). The Main Trigger Window 303 will appear just above and to the left of the cursor 300. Note that the Main Trigger Window is usually designated "left-click" by default because it is the most common operation. The user moves the cursor over the Main Trigger Window and continues to move the cursor in an upwards motion. The Secondary Trigger Window 303 will then appear. In this example, the Secondary Trigger Window designated "Drag" is located immediately above the Main Trigger Window. Without pausing, the user moves the cursor 300 through the Main Trigger Window 302 and stops over the Drag window 303. (The path the cursor travels is an upward arc 304.) The Clickless Tool application then returns the cursor to the spot the cursor was resting before the Main Trigger Window appeared and instructs the OS to perform a "drag". The screen element can now being "dragged" along when the user moves the cursor.

Figure 3A:
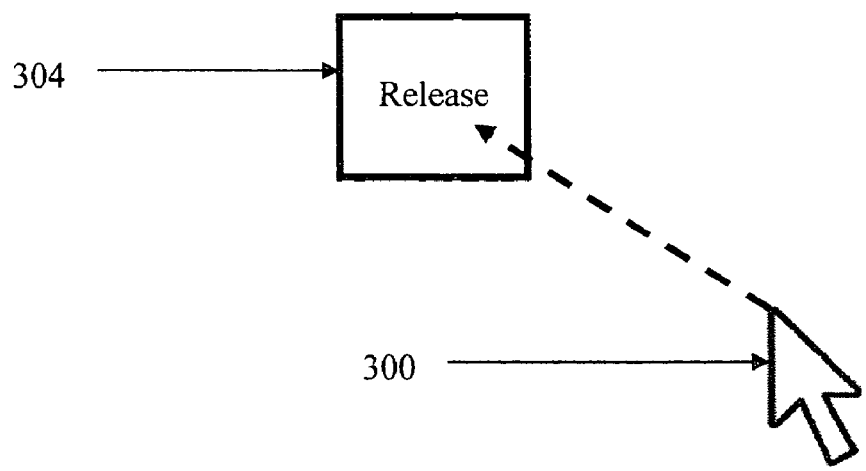

Whenever the user pauses the cursor while drag is activated, a new Trigger Window that is designated "Release" appears above and to the left of the cursor. See FIG. 3a. This is called the Release Window 304 and its function is to perform a "release" action (the simulated equivalent of lifting the finger from the left mouse button) when the user have finished dragging or selecting text. To perform a release, the user moves and stops the cursor over the Release Window 304. The Clickless Tool application then returns the cursor to the spot it was before the Release Window 304 appeared, and instructs the OS to perform a "release" action on whatever the cursor was dragging.

Figure 4:
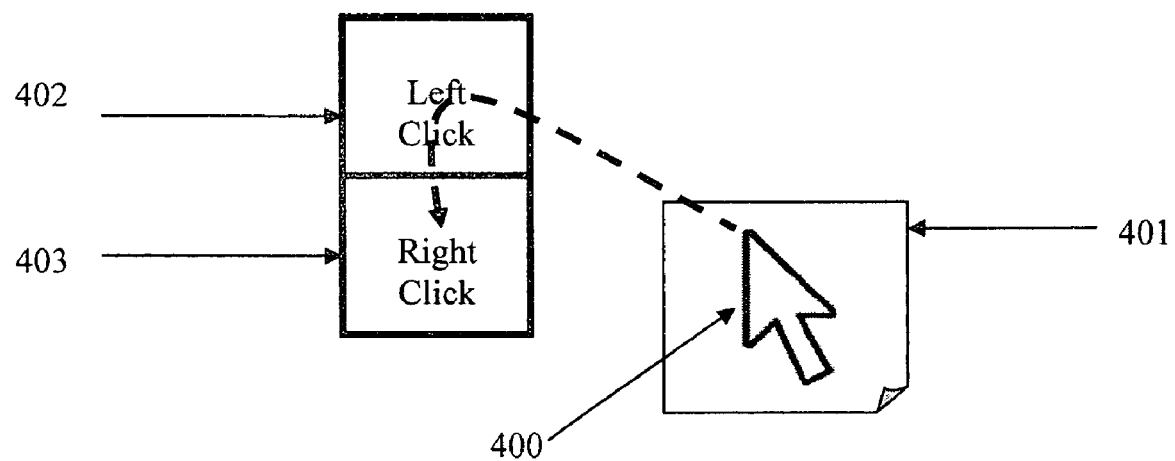

Refer now to FIG. 4. To perform a right-click, the user pauses the cursor 400 over the screen element 401 that he wants to perform a right click on. When the cursor is paused, the Main Trigger Window appears just above and to the left of the cursor as in the previous examples. The user moves the cursor over the Main Trigger Window and continues in a downwards motion. A Secondary Trigger Window designated "Right Click" 403 appears immediately at the bottom of the main Trigger Window. Without pausing, the user moves the cursor 400 through the Main Trigger Window 402 and stops over the Secondary Trigger Window (designated "Right Click") 403. (The path the cursor travels is an downward hook 404.) Note if the user stays within the Main Trigger Window and doesn't enter the Secondary Trigger Window, the mouse will perform a standard "left-click" action.

Figure 5:
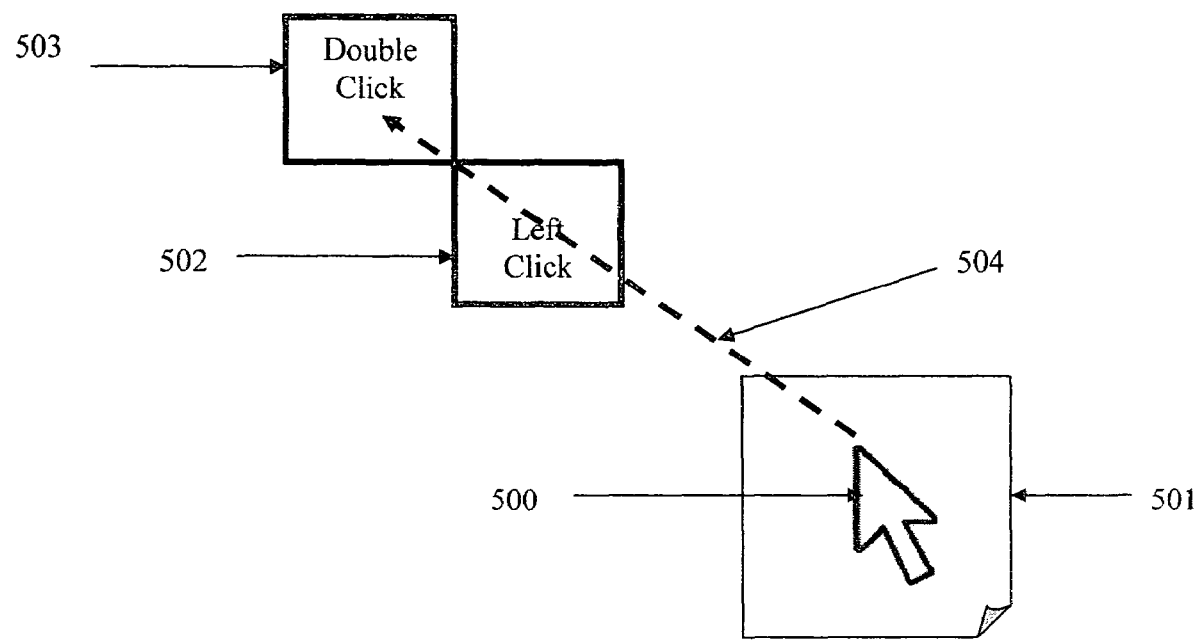

Refer to FIG. 5. As in the previous examples, to perform a double click the user moves the cursor over the Main Trigger Window 502. A Secondary Trigger Window designated "double-click" 503 appears immediately above and to the left (diagonal) to the Main Trigger Window 502. Without pausing, the user moves the cursor through the Main Trigger Window 502 and stops over the double-click window 503. Here, the cursor travels diagonally upwards 504 at approximately 45 degrees up and to the left. Once the user pauses the cursor inside the Secondary Trigger Window 503, the Clickless Tool application returns the cursor to the position before the Main Trigger Window appeared, and instructs the OS to perform a double-click action at that position.

The Clickless Tool can also easily handle user inputs that might involve the keyboard. For example, keyboard actions such as Ctrl+C, Ctrl+V, or any other key combination or sequence of key presses and/or mouse inputs (i.e., a macro) can be assigned to a Trigger Window.

The Clickless Tool can also provide a "continuous clicking" or "rapid-fire" command in which the application continuously simulates clicking a number of times per second until it is turned off. A user can customize this feature by setting the number of clicks per second and the Trigger Window to activate it. When a user triggers a "Continuous Clicking" command (in a way similar to how any other command such as double-click is triggered), the Clickless Tool start simulating mouse clicks a number of times per second, as assigned by the user, continuously. While Continuous Clicking is active, a user can turn it off by activating a release Trigger Window that becomes visible when Continuous Clicking was first activated. Continuous clicking can be useful for software applications that require a user to click multiple times in order to achieve the desired outcome. For example, when scrolling in any application, it is possible to scroll by clicking on the up or down triangle continuously. In many games, a user is required to perform fast clicks multiple times in succession. The Continuous Clicking command allows the user to achieve the same desired benefit while potentially minimizing injury.

As discussed previously, the Clickless Tool can be programmed in any programming language known or convenient. Without limitation to any particular programming language current or in the future, the core logic of the Clickless Tool application is described below. All countdown timers affecting the behavior of the application can be user-defined to be of varying length, as long as the following conditions are met: 1. The Idle Timer time span must be greater than hover timer time span. 2. Waiting for gesture timer time span must be greater than hover timer time span. 3. Stopping timer time span must be greater than hover timer time span.

The application, upon startup, remains in an "On Hold State" and waits for the user to move the cursor. We will define this state as step one. When the user moves the cursor, the application exits step one and executes step two. In step two, the application: 1. Resets all running timers; 2. Records and maintains the current mouse/input cursor position, 3. Starts countdown of a Stopping Timer and 4. Waits for one of the following events to occur: (a) The user moving the mouse/input cursor again before the Stopping Timer elapses, or (b) the Stopping timer elapses. In the case of (a) occurring, the application reverts to step two, resets the timers, maintains the cursor position and waits for another instance of (a) or (b) to occur. In the case of (b) occurring (i.e., the cursor has stopped moving for a duration defined by the Stopping Timer) the application executes step three.

In step three, the application collects and stores client state information. The application performs the following: 1. Obtains and stores the foreground window handle (the address of the current application that the user is working with); 2. Retrieves and stores the process name of the application (e.g. WINWORD.EXE for Microsoft Word) based on the foreground window handle; 3. Stores the current mouse/input cursor location and 4. Proceeds to step four.

In step four, the application: 1. Sets the location on the screen of each Trigger Window whose visibility attribute is set to Visible. The location is based on the current cursor location collected in step two and the values from the user-configured settings: the horizontal offset, vertical offset, and the visibility attribute; 2. Draws (i.e., makes visible on screen) all visible Trigger Windows; 3. Starts the idle timer and 4. Waits for one of the following events to occur: (a) The Idle timer elapses, or (b) The user moves the mouse/input cursor before the idle timer elapses. In the case of (a) occurring, the application proceeds to step five. If (b) occurs first, the application continues to execute step six.

In step five, the application hides all visible Trigger Windows, resets all timers and reverts to step one to await further user input.

In step six, the application: 1. Resets all timers; 2. Retrieves the current cursor location; 3. Checks if the cursor is within an "authorized region". An authorized region is a region that includes all visible Trigger Windows plus a buffer. For example, if two Trigger Windows are visible and/or Restricted and they occupy a space of 100 pixels×100 pixels and the buffer is 20 pixels on each side, then the authorized region is the part of the screen where the visible Trigger Windows are occupying plus 20 pixels on each side of the rectangle formed by the Trigger Windows. If the cursor is within an authorized region, the application continues with the rest of step six; if the cursor is not within an authorized region, then it proceeds to step eight; 4. Resets the Wait for Gesture timer; 5. Checks if the Trigger Windows are visible on the screen. If the Windows are visible, continue with the rest of step six. If the Windows are not visible, revert to step two; 6. Checks if the cursor is on one of the Trigger Windows. If the cursor is on a Trigger Window, the application proceeds to step eleven, else it proceeds to step nine; 7. Starts the Wait for Gesture timer.

The Wait for Gesture and Idle timers are very similar but there are a few differences. The Idle timer is active only when the trigger windows become visible the first time—the idle timer is active as long as the user does not move the cursor and counts down for how long the trigger window(s) is visible while the user is idle. If the user moves the cursor while the trigger window(s) is visible, then the Idle timer is reset and the Wait for Gesture timer is started—it also acts as a count down for how long the trigger window(s) stay visible. It differs from the Idle timer in that it has a shorter time span and resets and restarts every time the cursor is moved before it is elapsed. This feature allows the trigger window(s) to stay visible as long as the user wants by keeping the cursor moving. This feature is used to give users who have difficulty in moving the cursor quickly the ability to move the cursor over a trigger window without the need to race against the idle timer—As long as the user is moving the cursor without regard to speed, the trigger window(s) will stay visible.

Once the Wait for Gesture timer is started, the application waits for three possible events: a) The Wait For Gesture timer elapses: The application reverts to step five and then returns to the "on hold state" (step one); b) The User moves the mouse/input cursor before the idle timer elapses: The application reverts to step six; or c) The Hover timer elapses. The Hover timer countdowns how long the cursor hovers over the same location before an action, such as a left click, associated with the trigger window is triggered. The Hover timer is active only when a cursor is hovering in the same location within a trigger window. If this timer elapses, the application proceeds to step seven.

In step seven, the application executes the following: 1. Stops the Waiting for Gesture timer; 2. Retrieves the name of the Trigger Window that the cursor is on; 3. Retrieves the name of the foreground window that the user is working on; 4. Based on the Trigger Window name and the foreground window name, retrieves the action to be carried out. The action assigned can be a mouse action, keyboard action, or a macro such as copy, paste, cut, etc. (Note that a Trigger Window can be assigned more than one action—a global action and/or one or more specialized actions. When a Trigger Window has more than one action assigned to it, the application retrieves the correct action to be executed based on the following logic: 1. Find an action that matches the Trigger Window name and its attribute applications has the foreground window name; 2. If the above fails, then it searches for a global action that matches the Trigger Window name and applications attribute is set to "All" and can be executed without regard to the foreground window name.); 5. Decodes the retrieved action to an instruction that the OS can understand; 6. Returns the cursor back to its original position—Where the user stopped the cursor before moving toward and hovering on the Trigger Window; 7. Sends the action to the operating system for execution; 8. Allows the operating system to update the foreground window view (the restrictions set out in step nine, below); and 9. Reverts to the "On Hold" state of step one.

In step eight (i.e., the user tries to trigger an event when the cursor is not within an authorized region), the application: 1. Hides all Trigger Windows and 2. Reverts to the "On Hold" state of step one.

In step nine, the application executes the following: 1. Builds a "Freeze Drawing Update Region" that includes the main Trigger Window and a buffer on each side. This region is represented by a rectangle whose coordinates and dimensions are defined as: Rectangle location X-coordinate=Visible TriggerWindow location X−Horizontal Offset−1, Rectangle location Y-coordinate=Visible TriggerWindow location Y−Vertical Offset−1, Rectangle Width=Visible TriggerWindow Width+(Horizontal Offset *2)−2, Rectangle Height=Visible TriggerWindow Height+(Vertical Offset *2)−2. See FIG. 4. If the cursor is within the above region, the application executes step ten, and if not, the program reverts to step six-8 (Starts Waiting for Gesture Timer).

In step ten, the application prevents the client foreground window from having its view(s) updated. In other words, the application freezes how the foreground window is displayed and doesn't allow the OS to modify or update the foreground window screen view. Since each foreground window can have many window handles based on the content of the window, the foreground handle to be frozen could be all window handles associated the foreground window or a specific window handle extracted from the cursor's location. In Microsoft Windows, for example, functions such as WindowFromPoint (IntPtr handle) or GetForegroundWindow( . . . ) can be used to obtain this information. This feature is especially useful when the user is dragging the cursor or when selecting an option from a drop down menu. For example, when the user has selected a block of text and wants to release the dragging, he has to move to a Trigger Window that triggers a release of the drag. However, by moving towards the Trigger Window he may see that the text he has selected is being deselected or more text being selected. Even though the application knows what position to return the cursor to before the user released the drag and the selection will be correct, the user may get confused and thinks that the program is not working properly. Therefore, by freezing the window while the user is moving towards the Trigger Window, the user does not see the visual side effects of moving towards the trigger window and removes any likelihood of confusion. This feature also works when selecting an option from the drop down menu, scrolling (so as to remove any flickering effects), or in any other situation where there is a visual effect while moving toward one of the Trigger Windows.

Finally, in step eleven (where the cursor is within one of the Trigger Windows), the application executes the following: 1. Some Trigger Windows become visible only when the cursor is on a region within one of the visible Trigger Windows. Therefore, the application tests and retrieves the region that the cursor is on within the visible Trigger Window. Based on the region retrieved, the application can make zero, one or more Trigger Windows visible by setting their location based on the cursor location and their assigned position to other visible Trigger Windows. The Trigger Windows that are visible only when the cursor has entered a visible Trigger Windows are called "Shortcut Trigger Windows" with attribute "visibility type" set to restricted; 2. Start Hovering Timer. This timer is used when a cursor is entered and is hovering over a Trigger Window; 3. Reverts to step six-8 (Starts Waiting for Gesture Timer).

Although the system has been described in conjunction with specific embodiments thereof, it is evident that many alternatives, modifications and variations will be apparent to those skilled in the art. Accordingly, the system as described and hereinafter claimed is intended to embrace all such alternatives, modifications and variations that fall within the spirit and broad scope of the appended claims.

What is claimed is:

1. A system for a user to input commands to a computer system, comprising:
   a pointing device to manipulate a cursor on a computer screen,
   software means to track the movement of the cursor,
   wherein the software means displays a least one trigger window after a time period in which the cursor pauses on a position on the computer screen,
   the user moving the cursor to a trigger window and then pausing on said trigger window,
   said trigger window designating a pre-selected user input,
   the software means returning the cursor to the position on the computer screen when the software means displays said at least one trigger window, and
   the software means simulating a user input at the position of the cursor.

2. The system of claim 1, wherein the user input is a button press of the input device selected from the group consisting of right button click, left button click, left button double-click, right button double click, middle button click, middle button double-click, left button click and hold, right button click and hold, and middle button click and hold.

3. The system of claim 1, wherein the time period between the cursor pausing on a position on the computer screen and the software means displays said at least one trigger window is user configurable.

4. The system of claim 1, wherein the number of trigger windows displayed is user configurable.

5. The system of claim 1, wherein moving the cursor onto a first trigger window triggers the display of secondary trigger windows, each of said secondary trigger windows designating a different user input from the first trigger window.

6. The system of claim 1, wherein said software means is a software application.

7. The system of claim 1, wherein said software means is integrated into the computer system's operating system.

8. The system of claim 1, wherein the appearance of the trigger window is user configurable.

9. The system of claim 8, wherein the user configurable appearance aspect is chosen from the group consisting of size, opacity, height, width, color, back ground display, distance from the cursor, and border color.

10. A system for a user to input commands to a computer system, comprising:
    a pointing device to manipulate a cursor on a computer screen,
    software means to track the movement of the cursor,
    wherein the software means records the position of the cursor when the cursor stops moving,
    the user moving the cursor to a trigger window and then pausing on said trigger window,
    said trigger window designating a pre-selected user input,
    the software means returning the cursor to said recorded position on the computer screen and the software means simulating a user input at said recorded position.

11. The system of claim 10, wherein the trigger window remains hidden until after a pre-set period after the cursor stops moving.

12. The system of claim 10, wherein the trigger window is always visible.

13. The system of claim 10, wherein the user input is a button press of the input device selected from the group consisting of right button click, left button click, left button double-click, right button double click, middle button click, middle button double-click, left button click and hold, right button click and hold, and middle button click and hold.

14. The system of claim 10, wherein the time period between the cursor pausing on a position on the computer screen and the software means displays said at least one trigger window is user configurable.

15. The system of claim 10, wherein the number of trigger windows displayed is user configurable.

16. The system of claim 10, wherein moving the cursor onto a first trigger window triggers the display of secondary trigger windows, each of said secondary trigger windows designating a different user input from the first trigger window.

17. The system of claim 10, wherein said software means is a software application.

18. The system of claim 10, wherein said software means is integrated into the computer system's operating system.

19. The system of claim 10, wherein the appearance of the trigger window is user configurable.

20. The system of claim 19, wherein the user configurable appearance aspect is chosen from the group consisting of size, opacity, height, width, color, back ground display, distance from the cursor, and border color.

* * * * *